United States Patent [19]
Kaiser

[11] 3,847,703
[45] Nov. 12, 1974

[54] METHOD OF ALIGNING A LASER TUBE WITHIN AN ENVELOPE

[75] Inventor: Donald Bernard Kaiser, Lancaster, Pa.

[73] Assignee: RCA Corporation, New York, N.Y.

[22] Filed: Aug. 31, 1973

[21] Appl. No.: 393,624

[52] U.S. Cl............ 156/294, 331/94.5 D, 331/153, 264/278, 29/25.13, 29/25.15, 29/451, 29/464
[51] Int. Cl............................................ B32b 31/06
[58] Field of Search....... 29/203 F, 203 P, 451, 464, 29/25.13, 25.15; 156/294, 289; 331/94.5 D, 153; 264/278

[56] References Cited
UNITED STATES PATENTS 3,619,811  11/1971  Kaiser............................ 331/94.5 D
3,739,297  6/1973  Mark ............................. 331/94.5 D Primary Examiner—Daniel J. Fritsch
Assistant Examiner—Neal Kalishman
Attorney, Agent, or Firm—Glenn H. Bruestle; Irwin M. Krittman

[57] ABSTRACT

A laser tube is aligned within a cylindrical fixture using adjustment means therein. Then spaced pads of a cured elastomer are formed between the tube and the inside surface of the fixture, the pads being adherent to the tube and nonadherent to the fixture. Then the tube with the adhered pads thereon is removed from the fixture and inserted into a solid-wall cylindrical envelope having the same size internal diameter as the fixture to form a laser device.

4 Claims, 4 Drawing Figures

METHOD OF ALIGNING A LASER TUBE WITHIN AN ENVELOPE

BACKGROUND OF THE DISCLOSURE

This invention relates to a method of assembling a gas-discharge device and an envelope, and particularly, but not exclusively, to a gas-laser device.

A gas-laser device may be placed in any appropriate environment. One preferred environment is an envelope such as a metal cylinder. When an envelope is used, it is desirable that the laser-beam output be substantially concentric and parallel with the outside diameter of the envelope.

In one prior method of aligning the laser beam concentric and parallel with the envelope, permanent apertures are formed on the wall of the envelope to accommodate temporary tube-adjustment means and to inject elastomer pads in the envelope. Although this method provides satisfactory alignment, it requires providing apertures in every envelope, and then closing off the apertures after the alignment is established. This increases the cost of the laser device and, if the apertures are not properly closed, dirt or water may enter therethrough to cause damage to the device. Finally, the closed apertures result in an unattractive appearance of the finished device.

SUMMARY OF THE INVENTION

A laser tube is aligned within a solid-wall cylindrical envelope using a cylindrical fixture having the same size inside diameter as the envelope and including tubeadjustment means therein. Then spaced pads of a cured elastomer material are formed between the tube and the fixture, the pads being adherent to the tube and nonadherent to the fixture. Then the tube with the pads adhered thereto is removed from the fixture and is inserted within the solidwall cylindrical envelope to a desired location.

DESCRIPTION OF THE PREFERRED EMBODIMENT

Figure 1:
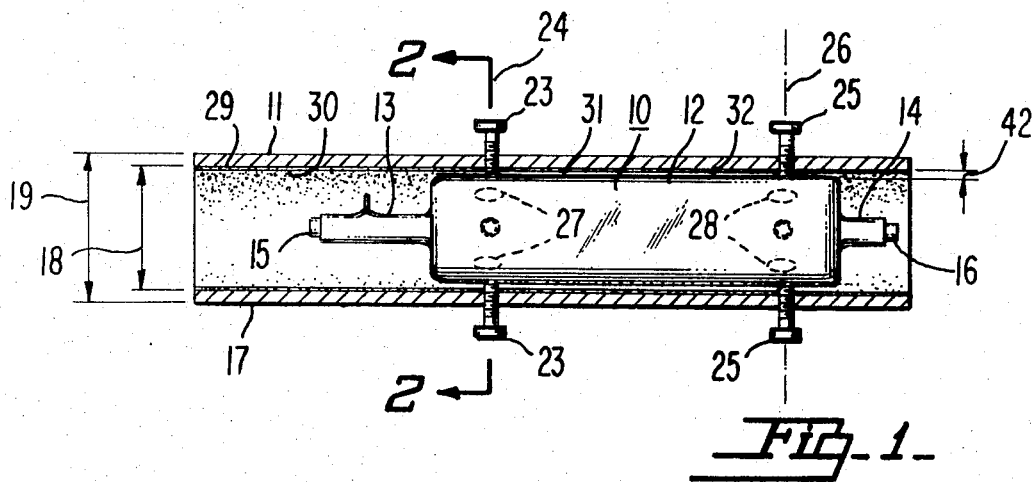
FIG. 1 is a partial sectional view of a laser tube positioned within an alignment fixture.
Figure 2:
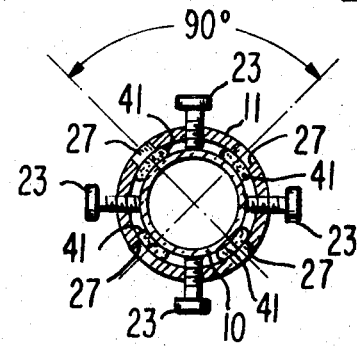
FIG. 2 is an end view of the tube and alignment fixture of FIG. 1 shown on section 2—2.

FIGS. 1 and 2 illustrate a gas-laser discharge tube 10 positioned in an alignment fixture 11. The laser tube 10 includes a large diameter glass portion 12, a left capillary 13, a right capillary 14, a reflecting mirror 15 attached to the left capillary 13, and an output mirror 16 attached to the right capillary 14.

The alignment fixture 11 comprises a metal cylinder 17 having a concentric internal diameter 18 and external diameter 19. The internal diameter 18 is equal to the internal diameter 20 of the finished envelope 21 used in the finished laser device 22 (shown in FIG. 4).

The alignment fixture 11 includes a first set of four threaded adjustment members 23 (shown in FIG. 2) positioned in a first plane 24 near the left end of the laser tube 10 and a second set of four threaded adjustment members 25 positioned in a second plane 26 near the right end of the laser tube 10. Referring to FIG. 2, each set of four threaded adjustment members 23 and 25 is positioned at a 90° angular spacing around the periphery of the cylindrical alignment fixture 11.

The alignment fixture 11 also includes a first set of four adhesive fill apertures 27 (shown in FIG. 2) spaced between each of the first set of threaded adjustment members 23 at the first plane 24 and a second set of four adhesive fill apertures 28 spaced between each of the second set of threaded adjustment members 25 at the second plane 26.

In the novel method, the internal surface 29 of the alignment fixture 11 has a coating 30 of an adhesive release agent such as No. MS-122 Fluorocarbon Release Agent, marketed by Dow Corning Inc. The external surface 31 of the large glass portion 12 of the laser tube 10 also has a coating 32 of adhesive primer such as No. 1200 Primer, marketed by Dow Corning Inc.

The laser tube 10 is then inserted within the alignment fixture 11 and roughly centered by clamping it therein using the first and second set of adjustment members 23 and 25 as shown in FIG. 1.

Figure 3:
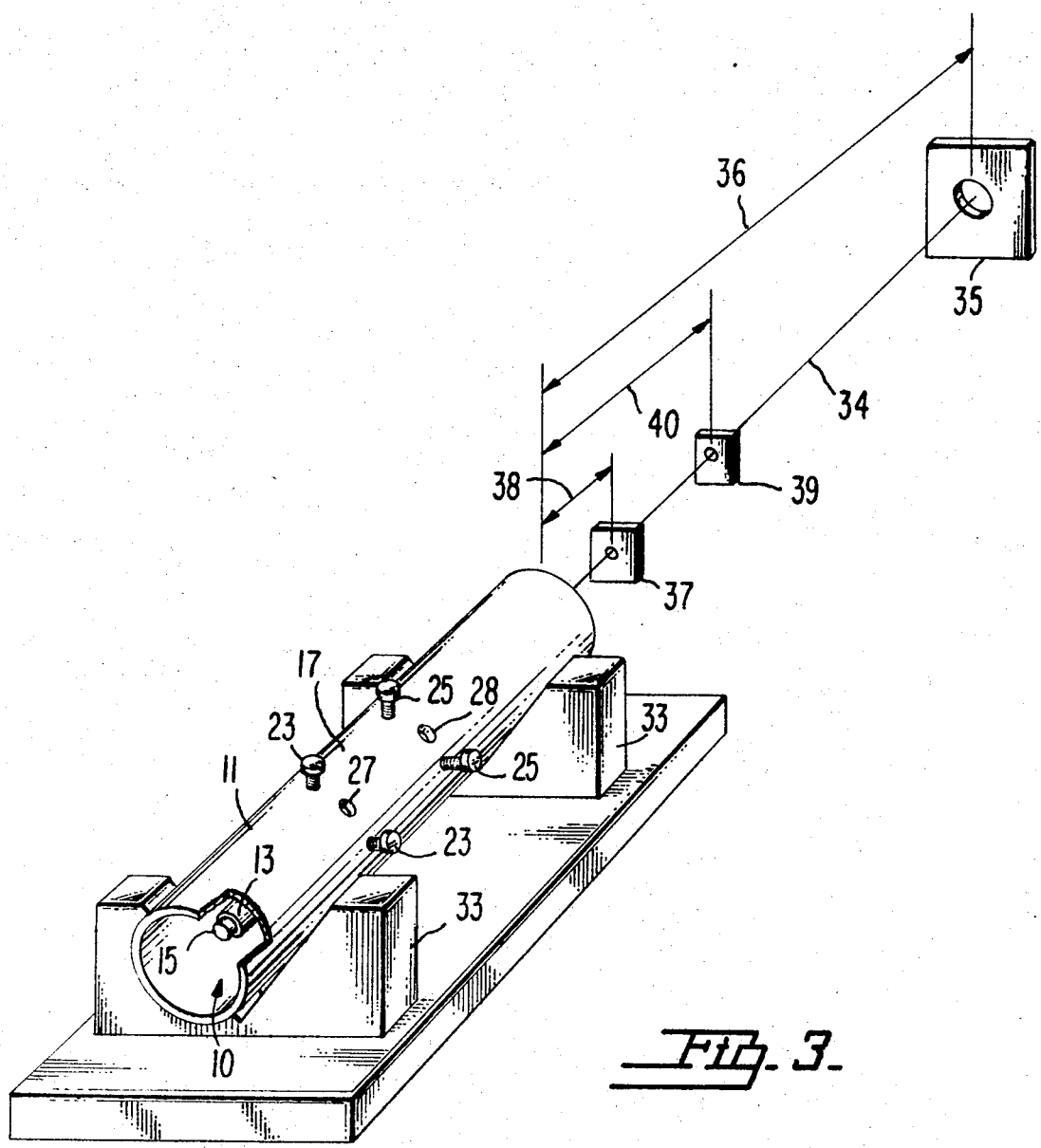
FIG. 3 is a perspective view of the laser tube positioned within an alignment fixture illustrating one step in the novel method.

The alignment fixture 11 with the laser tube 10 therein is then positioned on V-blocks 33, which form a part of an alignment range (partially shown in FIG. 3). The laser tube 10 is then connected to a suitable power supply (not shown) as is known, and operated to provide a laser beam 34. The laser beam 34 is directed to strike a target 35 a distance 36 of approximately 150 feet from the output mirror 16. Then the alignment fixture 11 is rotated in the V-blocks 33. The first set and second set of adjustment members 23 and 25 are adjusted to move the laser tube 10 within the alignment fixture 11 until the laser beam 34 remains within a 3-inch-diameter circle at the target 35 when the alignment fixture 11 is rotated a full 360° in the V-blocks 33.

Then, a first target screen 37 is placed approximately a first distance 38 of about 4 inches from the end of the output mirror 16. The alignment fixture 11 is then rotated while adjusting only the first set of adjustment members 23 until a displacement monitor (not shown) at the first target screen 37 records less than 0.050-inch runout of the laser beam 34 during a full 360°-rotation of the alignment fixture 11 in the V-blocks 33. Then a second target screen 37 is positioned a distance 40 of approximately 48 inches from the end of the output mirror 16. The alignment fixture 11 is again rotated within the V-blocks 33, while adjusting only the second set of adjustment members 25 until a displacement monitor (not shown) at the second target screen 39 records less than 0.050-inch runout of the laser beam 34 on the second target screen 39 during a full 360°-rotation of the alignment fixture 11 in the V-blocks 33. At this time, the laser tube 10 is clamped in the alignment fixture 11 with the laser beam 34 substantially concentric and parallel with the external diameter 19 of the alignment fixture 11. The power supply is disengaged from the laser tube 10, and the alignment fixture 11 with the laser tube 10 therein is removed from the V-blocks 33.

Then, an approximate uniform quantity of a liquid elastomer adhesive material is injected into each of the first set of four adhesive fill apertures 27 and the second set of four adhesive fill apertures 28. The amount of material injected into each of the apertures 27 and 28 must be sufficient to form pads 41, each pad being about ½ to ⅝-inch diameter filling the space 42 between the laser tube 10 and the inside of the finished envelope 21. The preferred liquid adhesive material is a room-temperature self-curing silicone rubber elastomer material such as No. 311 Encapsulant with Cab-O-Sil, marketed by Dow Corning Inc. After forming eight pads 41, the liquid-adhesive material may not protrude within the fill apertures. It is preferred that the apertures 27 and 28 are filled with a slight depression (substantially equal to the diameter of the fill aperture) in the pads 41 to permit their easy removal from the alignment fixture 11 and to prevent misalignment in the finished envelope 21.

The liquid-adhesive material is then allowed to cure and solidify. The curing time is about 4 hours at room temperature, and 1 hour at about 150°F.

The laser tube 10 is then removed from the alignment fixture 11. First, the two sets of adjustment members 23 and 25 are removed. Then, the laser tube 10 is pushed out by applying a gradual force against the output mirror 16. Since the pads (eight each) 41 are adhered to the primed laser tube 10 and are not adhered to the release agent primed alignment fixture 11, they are removed with the laser tube 10.

The laser tube 10 is now inserted into the final solid-wall finished envelope 21 to the desired position. The desired position is with the end of the output mirror spaced about one-half inch inside the right end of the finished envelope 21 as shown by the distance 44 in FIG. 4.

Figure 4:
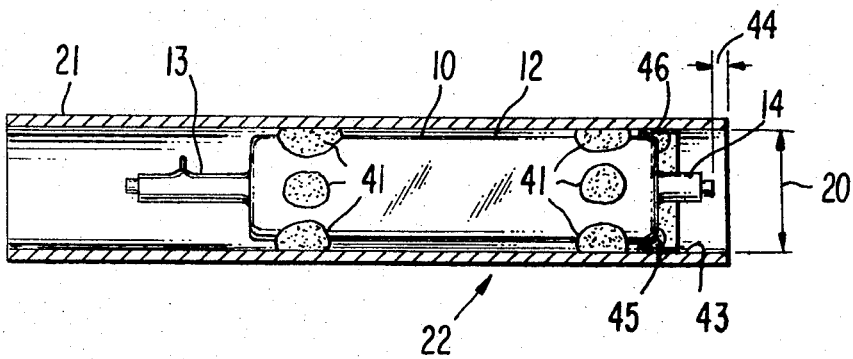
FIG. 4 is a partial sectional view of a laser tube positioned in a finished envelope.

Referring to FIG. 4, a coating 45 of a primer for a liquid adhesive material such as No. 1200 primer, marketed by Dow Corning Inc., is applied to the internal surface 43 of the finished envelope 21 at least adjacent the right end of the laser tube 10. Then a quantity of liquid-adhesive material is injected into the space 42 to form at least two buttons 46 between the right end of the laser tube 10 and the finished envelope 20. It is preferred that a sufficient amount of liquid-adhesive material be injected to form buttons 46 approximately one-fourth inch to three-eighths inch in diameter. The liquid-adhesive material is then cured as described above. After curing is complete, the laser beam 34 of the laser tube 10 is fixed in the desired longitudinal location therein to form a finished laser device 22. The novel method provides economy in manufacture of the laser device 22 and results in a finished laser device 22 which includes an attractive envelope which does not have apertures in the wall thereof.

I claim:

1. A method of aligning a laser device comprising a laser tube within a solid-wall cylindrical envelope using a cylindrical fixture having the same size inside diameter as said envelope and including tube adjustment means thereon, said method comprising the steps of
   a. aligning the laser tube within the cylindrical fixture using the adjustment means therein,
   b. then forming spaced pads of a cured elastomer adhesive material between said tube and said fixture, said pads being adherent to said tube and nonadherent to said fixture,
   c. then removing said tube with said pads adhered thereto from said fixture,
   d. and then inserting said tube with said adherent pads thereon within the solid-wall cylindrical envelope to a desired longitudinal location.

2. The method defined in claim 1 wherein said fixture includes a plurality of apertures in the walls thereof, said step (b) comprising
   i. applying a coating of a release agent for said elastomer adhesive material on the interior surface of said fixture,
   ii. applying a coating of a primer for said elastomer adhesive material on the exterior surface of said tube,
   iii. then injecting through each of the plurality of apertures a liquid elastomer adhesive material to form said spaced pads between said tube and said fixture,
   iv. and then allowing said material to cure and solidify.

3. The method defined in claim 1 wherein step (b) comprises
   i. forming a first set of pads substantially uniformly spaced around the left end periphery of said tube
   ii. and forming a second set of pads substantially uniformly spaced around the right end periphery of said tube.

4. The method defined in claim 1 including the additional steps of permanently fixing said tube in said envelope, said steps comprising
   e. applying a coating of a primer for an elastomer material to at least a portion of the interior surface of said envelope adjacent one end of said tube,
   f. injecting at least two substantially uniformly spaced bodies of liquid elastomer adhesive material between said primed exterior surface of said tube and said primed interior surface of said envelope,
   g. and then allowing said liquid elastomer adhesive material to cure and solidify.

* * * * *